United States Patent [19]

Mahabir

[11] Patent Number: 5,430,091

[45] Date of Patent: Jul. 4, 1995

[54] MOISTURE CROSSLINKABLE FLAME RETARDANT COMPOSITIONS FOR CABLE APPLICATIONS

[75] Inventor: Carl M. Mahabir, Brampton, Canada

[73] Assignee: AT Plastics Inc., Ontario, Canada

[21] Appl. No.: 241,003

[22] Filed: May 11, 1994

[51] Int. Cl.$^6$ ............................................. C08K 5/06
[52] U.S. Cl. ................................................. 524/371
[58] Field of Search ............... 524/371, 588, 466, 467, 524/411, 412; 525/29

[56] References Cited

U.S. PATENT DOCUMENTS

| | | |
|---|---|---|
| 3,832,326 | 8/1974 | North et al. |
| 3,856,890 | 12/1974 | Biddell |
| 3,860,676 | 1/1975 | Krackeler et al. |
| 3,950,456 | 4/1976 | Newcombe ........................ 524/467 |
| 4,092,292 | 5/1978 | Braus et al. |
| 4,381,362 | 4/1983 | Biggs et al. |
| 4,397,981 | 8/1983 | Doi et al. |
| 4,413,066 | 11/1983 | Isaka et al. |
| 4,446,283 | 5/1984 | Doi et al. |
| 4,549,041 | 10/1985 | Shingo et al. |
| 4,689,369 | 8/1987 | Ishino et al. |
| 4,798,864 | 1/1989 | Topcik |
| 5,312,861 | 5/1994 | Meverden et al. ........... 524/547 |

FOREIGN PATENT DOCUMENTS

| | | |
|---|---|---|
| 1043034 | 11/1978 | Canada. |
| 0370517 | 11/1989 | European Pat. Off. |
| 0501340 | 2/1992 | European Pat. Off. |
| 58-132013 | 8/1983 | Japan. |

*Primary Examiner*—Veronica P. Hoke
*Attorney, Agent, or Firm*—Cushman Darby & Cushman

[57] ABSTRACT

A moisture crosslinkable flame retardant composition comprising 25-75 wt % of a vinyl trialkoxy silane copolymer having a melt index selected from the range 0.2-25, and a silane content selected from 0.5-5 wt %; 15-20 wt % polyethylene having a melt index selected from 0.1-30, and a density selected from 0.93-0.96 g/ml; 10-35 wt % decabromodiphenyl oxide; and, optionally, 5-15 wt % 1,2,3,4,7,8,9,10,13,13,14,14-dodecachloro 1,4,4a,5,6,6a,7,10,10a,11,12,12a-dodecahydro 1,4,7,10-dimethanodibenzo (a,e) cyclooctene. The crosslinkable composition provides improved dielectric breakdown strength and flame retardancy. Improved electric cables are provided.

14 Claims, No Drawings

MOISTURE CROSSLINKABLE FLAME RETARDANT COMPOSITIONS FOR CABLE APPLICATIONS

FIELD OF THE INVENTION

This invention relates to moisture crosslinkable flame retardant compositions for cable applications comprising random copolymers of ethylene and vinyl trialkoxysilane, halogen containing flame retardant and high density polyethylene.

BACKGROUND TO THE INVENTION

A polyethylene resin such as low density polyethylene and the like has been generally crosslinked to enhance its mechanical strength, heat resistance and other properties. One such method of crosslinking ethylene polymers involves incorporating alkoxysilane functionality into the polymer structure either by grafting unsaturated alkoxysilanes onto the ethylene polymers or by direct copolymerization of ethylene with unsaturated alkoxysilanes, herein referred to as EVS copolymers.

The silane copolymer can be crosslinked by exposing the copolymer to moisture i.e., the silane is such that it makes the copolymer hydrolysable. The crosslinking is accelerated in the presence of an appropriate silanol condensation catalyst such as dibutyl tin dilaurate, dioctyl tin maleate, stannous acetate zinc octate stannous octate iron 2-ethyl hexoate and other metal carboxylates.

When polyethylene copolymerized with the unsaturated silane compound is used as electric cable insulation, there has been a problem in that the retention of dielectric strength after a mechanical glancing impact is not always satisfactory and especially unsatisfactory when flame retardants are incorporated into the compositions. The reasons for these problems are not fully understood.

Known typical flame retardant resin compositions used for the insulation of wire and cable, comprise antimony trioxide and a chlorine flame retardant or bromine flame retardant with a polyethylene. These halogen containing compositions such as, for example, bromine containing decabromodiphenyl oxide (DBDPO), works by releasing heavy non-flammable hydrogen halide (bromide) gases. Due to its high halogen content DBDPO (83.3% bromine), lower amounts of filler are required than with the chlorine containing 1,2,3,4,7,8,9,10,13,13,14,14-dodecachloro 1,4,4a,5,6-,6a,7,10,10a,11,12,12a-dodecahydro 1,4,7,10-dimethanodibenzo (a,e) cyclooctene (Dechlorane Plus 25 (65.1% chlorine)). The latter is known to act as a better char promoter than the former.

However, there remains a need for flame retardant electric cable insulation which has both acceptable flame retardancy and dielectric strength after glancing impact.

In accordance with the present invention, I have found that the use of particular compositions comprising a random copolymer of ethylene and a vinyl trialkoxysilane and a flame retardant mixture, optionally, containing certain additives results in the formation of a flame retardant polymeric composition that when used as a primary insulating coating, enables the finished product to pass the vertical wire (VW-1) flame test and glancing impact test requirements designated by Underwriters Laboratories Inc (UL) for XHHW cable applications. The former requires that a vertical specimen of an insulated conductor shall not flame longer than 60 s following five 15-s application of flame, the period between applications being 15 s. The test specimens must not ignite combustible materials in the immediate vicinity or damage more than 25% of the indicator flag (UL 1581 1080.1-1080.9). The latter requires that the breakdown potential of each of six specimens of finished solid No. 14 AWG Type XHHW wire that have separately been subjected to a glancing impact (45°) of 2 J or 0,207 m-kgf shall not be less than 20% of the average breakdown potential of six adjacent specimens of the same wire not subjected to impact (UL 1581, 700.1-700.6).

SUMMARY OF THE INVENTION

It is an object of the present invention to provide a moisture crosslinkable flame retardant composition of use in the manufacture of electric cable insulation, which composition when crosslinked provides improved dielectric breakdown strength and flame retardancy.

It is a further object of the present invention to provide an electric cable comprising an electrical conductor and said crosslinked composition.

Accordingly, the invention provides in its broadest aspect a moisture crosslinkable flame retardant composition comprising 25-75 wt % of a vinyl trialkoxy silane copolymer having a melt index selected from the range 0.2-25, and a silane content selected from 0.5-5 wt %; 15-20 wt % polyethylene having a melt index selected from 0.1-30, and a density selected from 0.93-0.96 g/ml; and 10-35 wt % decabromodiphenyl oxide.

The compositions of the invention, optionally, further comprise 5-15 wt % 1,2,3,4,7,8,9,10,13,13,14,14-dodecachloro 1,4,4a,5,6,6a,7,10,10a,11,12,12a-dodecahydro 1,4,7,10-dimethanodibenzo (a,e) cyclooctene.

The crosslinkable compositions of the invention are useful in coating electrical wire and cable with improved flame retardancy and retention of dielectric strength after glancing impact.

Preferably, the vinyl trialkoxysilane is vinyl triethoxysilane and, more preferably, vinyl trimethoxysilane, and wherein the silane content is preferably within the range 1.5-2.5 wt % and has a melt index selected from 0.5 to 5. The compositions of the invention, most preferably, contain 30-35% vinyl trialkoxy silane.

A preferred composition comprises 55-65 wt % of vinyl trimethoxysilane, 15-20 wt % polyethylene and 10-15 wt % decabromodiphenyl oxide.

The flame retardant filler of use in the practice of the invention, optionally, is a synergistic combination of brominated and chlorinated compounds, as hereinbefore defined. A preferred ratio of halogenated compounds in the compositions of the invention is about 10 wt % Dechlorane Plus 25 with about 30 wt % of DBDPO.

The halogen compounds are preferably used in combination with an antimony compound such as, for example, antimony trioxide, antimony sulphide, sodium antimonite, potassium antimonite, and the like. The antimony additive will generally be employed in amounts ranging from about 3 to 20 wt %, preferably 5 to 10 wt %, most preferably, about 7.5 wt %, based on the total weight of the composition.

The compositions of the invention may further comprise additives known and standard in the art of polymer processing and crosslinking, such as for example, processing aids, condensation catalysts, antioxidants or stabilizers.

In a further aspect, the invention provides a method for the production of a coated electrical conductor coated with a flame retardant crosslinked polyethylene composition, said method comprising coating said conductor with moisture crosslinkable flame retardant composition as hereinabove defined and crosslinking said composition.

In yet a further aspect the invention provides a coated electrical conductor made by the process as hereinabove defined.

Such methods may be readily carried out by apparatus and techniques known within the art of manufacture of flame retardant containing crosslinked polymer coated electric cable and wire.

DESCRIPTION OF PREFERRED EMBODIMENTS

In order that the invention may be better understood, preferred embodiments will now be described by way of example only with reference to the accompanying Tables wherein;

TABLE A provides the results of investigations on the effect of process aids to improve dielectric breakdown strength after glancing impact of an insulation passing the horizontal flame test;

TABLE B provides the results of investigations on the effect of impact modifiers to improve dielectric breakdown strength after glancing impact of an insulation passing the horizontal flame test;

TABLE C provides the results of investigations on the effect of softer polymers on the dielectric breakdown strength after glancing impact of an insulation passing the horizontal flame test;

TABLE D provides the results of investigations on the effect of higher density polymers on the dielectric breakdown strength after glancing impact, of an insulation passing the horizontal flame test; and TABLE E provides results for flame retardant compositions tested for vertical flame test, dielectric strength after glancing impact and optimum tensile properties.

Material and Test Procedures

Materials

AT 910 is an ethylene vinyl trimethoxysilane (EVS) copolymer with a melt flow index of 0.6. (AT Plastics Inc., Brampton, Ontario Canada)

AT 2030 is ethylene vinyl acetate (EVA) copolymer with a 20% vinyl acetate (VA) content and a melt flow index of 15. It is used as a carrier resin for master batches.

AT 2820-g-silane is a grafted silane terpolymer with 28% VA. This a product of AT Plastics Inc.

AT 4030 is an ethylene vinyl acetate (EVA) copolymer with a 40% VA content and a melt flow index of 55 g/10 min. This is a product of AT Plastics Inc.

1.5 MI EVS is an ethylene vinyl trimethoxysilane copolymer with a melt flow index of 1.5 g/10 min. This is a product of AT Plastics Inc.

AT 930 is an ethylene vinyl trimethoxysilane copolymer with a melt flow index of 2.5 g/10 min. This is a product of AT Plastics Inc.

15 MI EVS is an ethylene vinyl trimethoxysilane copolymer with a melt flow index of 15 g/10 min. This is a product of AT Plastics Inc.

AT 980 is a high density polyethylene grafted with a silane monomer. It has a density of 958 kg/m$^3$. This is a product of AT Plastics Inc.

Antimony trioxide ($Sb_2O_3$)—sold under trademarks such as Thermoguard S, Thermoguard L, Antimony oxide KR, Antimony oxide LTS, FireShield H, and FireShield L.

Decabromodiphenyl oxide (DBDPO)—sold under trademarks such as Great Lakes DE-83 and DE-83R, Thermoguard 505, Saytex 102E, and AmeriHass FR 1210.

Dechlorane Plus 25 (Dec Plus 25) is the trademark given to 1,2,3,4,7,8,9,10,13,13,14,14-dodecachloro-1,4,4a,5,6,6a,7,10,10a,11,12,12a -dodecahydro-1,4,7,10-dimethanodibenzo (a,e) cyclooctene. This product is supplied by Occidental Chemical Corporation.

Aluminum silicate (Calcined Kaolin)—sold under trademark such as Translink 37 and Translink 77.

Polydis TR016 is a blend of fatty acid metal salt and an amide. It acts as an efficient blending and processing/dispersing agent in highly filled systems. This product is supplied by Struktol.

Polydis TR060 is a mixture of aliphatic resins with molecular weight below 2000. It is a processing agent that acts as a binder in highly filled systems. This product is supplied by Struktol.

Polydis TR121 (Oleamide) is the unsaturated fatty primary amide derived from oleic acid. It acts as a slip/lubricant/dispersant agent. This product is supplied by Struktol.

Ucarsil PA-1/D55 is a process aid used for improved dispersion. This product is supplied by Union Carbide Corporation.

Durastrength 200 is an acrylic impact modifier that offers outstanding impact retention. This product is supplied by M&T Chemicals Inc.

Metalblen C-201 is a polymeric impact modifier that offers impact resistance to rigid plastics. This product is supplied by Metco North America Inc.

Royalene IM 7565 is a low ethylene EPDM polymer which is excellent for impact modification of olefinic resins. This product is supplied by Uniroyal Chemical Company, Inc.

Royalene IM 7200 is a high ethylene EPDM polymer used to improve stress crack resistance of polyethylene. This product is supplied by Uniroyal Chemical Company, Inc.

Attane 4001 is an ultra low density copolymer with a density of 912 kg/m$^3$. This product is supplied by The Dow Chemical Company.

Escorene HD-6908 is a high density polyethylene with a density of 965 kg/m$^3$.

Exxon HD-9856B is a high density polyethylene with a density of 956 kg/m$^3$.

Dow 8534 is a high density polyethylene with a density of 958 kg/m$^3$.

Dow 2047E is a low density polyethylene with a density of 917 kg/m$^3$.

Dow 2037A is a medium density polyethylene with a density of 940 kg/m$^3$. Dow 8534, Dow 2047E and Dow 2037A are supplied by The Dow Chemical Company.

Sclair 14J1 (Trademark-Dupont) is a medium density polyethylene with a density of 940 kg/m$^3$. This product is supplied by Dupont.

Test Procedures (1) Flame tests

The test is conducted with the specimen crosslinked composition in a three sided enclosure being 305 mm wide, 355 mm deep and 610 mm high, and the top and front being open. A flat horizontal layer of untreated surgical cotton 6–25 mm thick covers the floor of the enclosure. A Tirrill gas burner is adjusted so that the overall height of the flame is 100–125 mm and the blue inner cone 38 mm high. The temperature at the tip of the inner blue cone is 816° C. or higher as measured with a chromel-alumel thermocouple. A wedge to which the base of the burner can be secured is provided for tilting the barrel 20° from the vertical while the longitudinal axis of the barrel remains in the vertical plane. The flame is applied to the specimen at the point at which the tip of the blue inner cone touches the center of the front of the specimen. This operation and the remainder of the test are conducted under a force-draft exhaust hood or cabinet operating to provide removal of smoke and fumes but not having drafts that affect the flame. The specimen passes the flame test if 5 out of 5 samples meets the criteria below:

(i) The horizontal flame test, a 254 mm specimen is cut from a sample length of finished single conductor insulated wire and secured with its longitudinal axis horizontal in the center of the enclosure. The specimen supports are 203 mm apart, and the three metal rods whose free ends are not closer than 19 mm to the specimen are used to indicate three points on the specimen—the point midway between the specimen supports and points 51 mm to each side of the specimen midpoint. The lit burner is moved into the position to apply the tip of the blue inner cone of its flame to the specimen midpoint, kept there for 30 s, removed to a position well away from the specimen, and then extinguished by closing the gas supply valve. Note is taken and recorded of whether any flaming progresses beyond either or both of the indicators 51 mm from the specimen midpoint. Note also is taken and recorded of whether any particles or drops are emitted by the specimen during or after application of the flame.

The wire is judged capable of conveying flame along its length if flaming of the specimen progresses beyond either or both of the 51-mm indicators. The wire is also judged to be capable of conveying flame to combustible materials in its vicinity if any particles or drops that are emitted by the specimen at any time during or after application of the gas flame ignites the cotton on the burner, wedge, or floor of the enclosure. Flameless charring of the cotton is to be ignored.

(ii) The vertical (VW-1) flame test, a 457 mm specimen is cut from a sample length of finished single conductor insulated wire and secured with its longitudinal axis vertical in the center of the enclosure. A strip of unreinforced 94 g/m² kraft paper of 13 mm wide, approximately 0.1 mm thick, and gummed on one side is used to make an indicator flag. The strip is wrapped around the specimen once with its lower edge 254 mm above the point at which the blue inner cone is to touch the specimen. This indicator flag projects 19 mm from the specimen to the rear of the enclosure. The lower clamp for the specimen must not be closer than 76 mm from the point at which the blue inner cone touches the specimen. The lit burner is moved into position to apply the tip of the inner blue cone to the specimen, kept there for 15 s, removed for 15 s, longer if flaming of the specimen persists and the like for a total of five 15-s applications of the gas flame to the specimen with 15 s,—longer if flaming of the specimen persists, between applications. If flaming of the specimen persists longer than 15 s, the gas flame is not to be reapplied until flaming of the specimen ceases of its own accord. In the latter case the gas flame is to be reapplied as soon as flaming of the specimen ceases. The gas flame is reapplied to the specimen 15 s after the previous application if flaming of the specimen ceases of its own accord within 15 s of the previous application.

If any specimen of the wire shows more than 25 percent of the indicator flag burned away or charred (soot that can be removed with a cloth or the fingers or brown scorching are to be ignored) after any of the five applications of the flame, the wire is judged to be capable of conveying flame along its length. If any specimen of wire (2) emits flaming or glowing particles or flame drops at any time that ignites the cotton on the burner, wedge or floor of the enclosure (flameless charring of cotton is to be ignored), the wire is to be judged capable of conveying flame to combustible materials in the vicinity. If any specimen of the wire (3) continues to flame longer than 60 s after any application of the gas flame, the wire is judged to be capable of conveying flame to combustible materials in its vicinity.

(2) Dielectric Breakdown after glancing impact

Both ends of each of six 380-mm specimens of finished solid No. 14 AWG Type XHHW wire are secured to one of the broad face of a hard oak board measuring approximately 50 mm by 100 mm in cross section without damage to the insulation and in a manner that results in the wires being straight and parallel to the longitudinal axis of the board. The board is rigidly supported with the plane formed by the wires inclined 45° from the horizontal and each wire in a vertical plane. A weight of 0.454 kg consisting of a solid right-circular steel cylinder that is 20 mm in diameter, has all surfaces smooth, and has one end rounded to a hemisphere is supported with its longitudinal axis vertical and in a vertical plane containing one of the wires. The hemispherical end is to be down and centred 460 mm above the midpoint of the length of the wire. A straight vertical tube having a 22-mm inside diameter is to surround the cylinder and serve as a guide to keep the cylinder vertical while the cylinder is falling and after it has hit the wire. The inside surface of the guide tube is to be smooth and the tube is of a length that keeps the cylinder from coming out of the guide tube.

While the specimen of wire, the apparatus, and the surrounding air are in thermal equilibrium with one another at a temperature of 24.0°±8.0° C., the cylinder is released, fall freely in the guide tube, and strike the wire once, and is then immediately to be raised back up to and secured at the 460-mm height. This process is repeated for each of the five remaining specimens of wire. Each of the impacted specimen has its impacted area immersed in tap water that is at a temperature of 24.0°±8.0° C. The water is in an earth-grounded metal container whose inside metal surface is directly and entirely in contact with the water, but not painted, enamelled, or otherwise insulated. The insulation in the impacted area of each specimen is stressed electrically to breakdown by means of a 48–62 Hz potential applied between the conductor in the specimen and the earth-grounded water container. The test potential is supplied by a transformer complying with UL 1581 paragraph 820.1.

The applied potential is increased from near zero to an essentially uniform rate that (i) is not less than 100 percent of the voltage rating for the product in 60 s and (ii) is not more than 100 percent in 10 s. The rate of increase is not to exceed 500 V/s in any case. The increase continues in this manner until breakdown occurs. The breakdown potential for each of the six impacted specimens is recorded. Each of six 380-mm or longer wire specimens not subjected to the impact is subjected to the dielectric-breakdown procedure with the center portion of its length immersed in water as described above. The breakdown potential is to be recorded for each of these specimens and the average of these potentials is calculated and recorded.

The breakdown potential of each of six specimens of finished solid No. 14 AWG Type XHHW wire that have separately being subjected to a glancing impact of 2 J or 0.207 m-kgf shall not be less than 20 percent of the average breakdown potential of six adjacent specimens of the same wire not subjected to the impact.

(3) Ultimate tensile elongation and strength

Samples for the physical tests are taken from a coil or reel of finished wire. The tests are conducted at a temperature of 24.0°±8.0° C. Unless the manufacture requires them to be made sooner, the measurements of tensile strength and elongation are not made until at least 48 hours after the wire is manufactured. The sample is cut into specimens of a convenient length. The insulation is then cut circumferentially at a distance of 13 mm from each end of the specimen, the cut ends of the insulation are removed, and the exposed ends of the conductor are freed from any adhering particles. Measurements to 0.01 mm of the diameter of the conductor and the diameter over the insulation are made with a machinist's micrometer calliper, dead-weight dial micrometer, or optical device. The diameter of each exposed end section of the copper is measured at a point 6 mm from the end, and the average of two measurements is taken as the diameter of the conductor. Measurements of the maximum and the minimum diameters over the insulation are made at a point halfway between the ends of the specimen and at points 25 mm to each side of the midpoint. The average of the maximum and minimum diameters at each point is determined, and the lowest of the three averages is used as the diameter of the specimen in calculating the cross-sectional area. The cross-sectional area of a tubular specimen is computed by means of the formula $$A = 0.7854 \, (D^2 - d^2)$$

where A is the cross-sectional area of the specimen, D is the diameter over the insulation, and d is the diameter of the conductor.

The conductor is then removed from the insulation and two marks 25 mm apart and equidistant from the center of the specimen, are placed upon the specimen. These bench marks are right angles to the direction of pull in the testing machine. Elongation and tensile-strength measurements are made on a power-driven machine provided with a device that indicates the actual maximum load at which the specimen breaks. Each specimen is clamped in the position with both 25-mm bench marks outside of and between the grips. The movable grip is adjusted to make the specimen taut but not under tension. The grips are then separated at a rate of 500±25 mm/min until the specimen is ruptured. During separation, the distance between the bench marks are observed continuously. The distance is observed at the instant of rapture and is recorded with an accuracy of at least 2 mm. The ultimate elongation, in percent, is taken as 100 times the increase in the distance between the bench marks, which originally were 25 mm apart. After rapture the maximum load is noted from the dial or scale and recorded together with the original dimensions of the specimen for use in calculating the tensile strength.

The minimum acceptable elongation (25-mm bench mark) is 150 percent, and the minimum acceptable tensile strength (at break) is 1500 psi (10.3 MPa).

RESULTS

1. Improvement in the dielectric performance of Flame Retardant Compositions passing a horizontal flame test:

A flame retardant moisture cross-linkable insulation composition (I) known to the prior art and which satisfies the horizontal flame test, was taken as a basic comparative example by way of illustrating the advance of the present invention.

| Component | (I) Wt (%) |
|---|---|
| AT 910 | 76.0 |
| AT 2030 | 7.4 |
| DBDPO | 10.3 |
| $Sb_2O_3$ | 6.3 |

When fillers are used in a polymeric composition such as (I), improved dispersion of the fillers with the polymer and increased compatibility with the polymer matrix can be expected by incorporation of a process/dispersion aid. Better filler dispersion should improve the intrinsic properties such as tensile break strength and dielectric break strength of the insulation, thereby enabling it to pass the glancing impact test. The dispersion/process aids were added to the above composition (I) at 2% by weight (Table A).

Commercially available process/dispersion aids from Struktol (TR 016, TR 060, TR 121) and Union Carbide (Ucarsil PA-1/D55) used in examples (1-5, Table A) are known to provide easier incorporation of fillers and additives, more homogeneous dispersion of highly filled systems and higher impact in filled compounds.

However, such improved properties were not reflected in improved performance under glancing impact tests.

The glancing impact test reveals the impact resistance of sample (I). It seemed probable that the introduction to composition (I) of an impact modifier would make the flame retardant cross-linkable composition impact resistant. Commercially available impact modifiers are EPR and EPDM rubbers (Royalene IM 7200 & IM 7565), acrylic impact modifiers (Durastrength 200) and others such as Metablen C-201 & C-202. The additions to composition (I) of these known impact modifiers were therefore expected to increase the toughness of this EVS system and enable it to pass the glancing impact test. However, as shown in examples 6-11 (Table B), no improvement to the impact resistance to the flame retardant filled EVS (I) was observed.

Since the "toughness" imparted by the impact modifier did not improve the glancing impact performance, the insulation was made softer so that it can be resilient to the mechanical impact. This was done by adding high EVA polymers or ultra low density PE to the composition and by increasing the melt flow index of the EVS, described in examples 12-18 (Table C).

Some of these examples have shown a definite improvement under glancing impact, with reduced fracture. However, all samples exhibited very low and unacceptable values for insulation dielectric breakdown.

Surprisingly however, when samples of AT 980 (high density EVS) was subjected to the glancing impact test, they did not fracture and hence retained their dielectric strength by >80%. Various HDPE was included into the EVS system to determine the minimum polymer density required to pass the glancing impact test without being detrimental to other performances required for XHHW applications and results shown (examples 19–27, Table D).

The polyethylenes of use in the present invention included essentially all high, medium and low density polyethylene as well as mixtures thereof. The most preferred polyethylene for blending for use as insulation for wire and cable generally have a density from about 930 to about 960 kg/m³ and a melt flow index from about 0.1 to 30. Suitable EVS', preferably, have a density $\geq$930 kg/m³ or EVS with <930 kg/m³ that are blended with another polyethylene that results in the polymeric component having a density $\geq$930 kg/m³.

2. Flame Retardant Compositions with improved Dielectric performance and passing VW-1 Flame and Ultimate tensile tests:

The present invention provides a flame retardant crosslinked composition and a flame retardant cable using the same which are excellent in both flame retardancy and forming quality.

The flame retardant additives of use in the composition of the present invention are compatible or miscible with the EVS copolymer.

The ingredients of the crosslinkable compositions of the invention, optionally together with catalyst, stabilizers, pigments and other auxiliary materials are kneaded and blended in conventional kneaders, mixers or extruders with the polymer components.

The components can be supplied and extruded onto wire as a two or three component system. It is convenient to prepare master batches wherein high concentrations of a silanol condensation catalyst or flame retardant fillers are formulated with a dispersion medium such as polyethylene and subsequent addition of suitable amounts of the master batch to the copolymer in such quantities as to produce the desired concentration. Alternatively, the silanol condensation catalyst and the flame retardant fillers can be combined to produce one master batch, or the flame retardant fillers compounded with the EVS copolymer and extruded with catalyst master batch.

Conventional procedures and apparatus can be employed in extruding the flame retardant compositions of this invention onto wires or cables. The compositions (given in Table E) were prepared and extruded onto 14 AWG solid copper conductor with a 30 mil insulation coating.

A review of examples (a-s) in Table E, shows that in order to consistently pass the vertical flame test (VW-1) specified by Underwriters Laboratories (UL 1581), the composition must have a halogen content >30, but preferably a polymer/halogen ratio <2. The desirability of the synergist $Sb_2O_3$ is seen in examples (1–o) where although the polymer/halogen ratio is <2, these samples failed the vertical (VW-1) flame test. The halogen content should be a combination of DBDPO and Dechlorane Plus 25. A comparison of examples r and s shows that when the halogen is bromine only (example r), during flaming, the insulation emits a lot of flaming particles that could ignite the surrounding flammable materials. However, the combination with Dechlorane Plus 25 (char promoter) eliminates the flaming particles. The chlorine/bromine ratio is designed to provide maximum halogen content with minimum total fillers while maximizing the chlorine component to produce the minimum char required to eliminate the flaming particles (examples a and f-s). It is also seen from example e, when Dechlorane Plus 25 alone was used, good flame retardancy is achieved; however, the finished product did not have dielectric integrity after glancing impact.

For the composition to pass both the flame and glancing impact test while maintaining good physical properties, the preferred choice of dispersion medium for the fillers were LMDPE. This provided a composition with good physical properties; a polymer density of minimum 930 kg/m³ was found to be required to pass the glancing test as established earlier and confirmed in examples (a–s). Any composition with polymer density lower than this value will fail this particular test; and a value >944 will yield poorer physical properties with the amount of fillers required to pass the flame test.

In Tables A and B, the presence of AT 2030, an ethylene vinyl acetate (EVA) copolymer, in examples (1–9) results in a value for the polymer density higher than the true density, because of the higher density of the acetoxy side chain of the EVA copolymer.

In Table C the N/A notation means that such density values will not be a measure of the true density because of the presence of EVA component to a higher proportions (AT 2820-g-silane, AT 4030, refer details of vinyl acetate content under Materials and Test Procedures).

TABLE A

Investigations on the effect of process aids to improve dielectric breakdown strength after glancing impact, of an insulation passing horizontal flame test

| Components (% by wt) | 1 | 2 | 3 | Comp. 4 | 5 |
|---|---|---|---|---|---|
| AT 910 | 76 | 74 | 74 | 74 | 74 |
| AT 2030 | 7.4 | 7.4 | 7.4 | 7.4 | 7.4 |
| DBDPO | 10.3 | 10.3 | 10.3 | 10.3 | 10.3 |
| $Sb_2O_3$ | 6.3 | 6.3 | 6.3 | 6.3 | 6.3 |
| TR 060 | — | 2 | — | — | — |
| TR 016 | — | — | 2 | — | — |
| TR 121 | — | — | — | 2 | — |
| Ucarsil PA-1/D55 | — | — | — | — | 2 |
| Horizontal Flame test | P | P | P | P | P |
| Glancing impact | F | F | F | F | F |
| Polymer density | 927 | 927 | 927 | 927 | 927 |

TABLE B

Investigation on the effect of impact modifiers to improve dielectric breakdown strength after glacing impact, of an insulation passing horizontal flame test

| Components (% by wt) | 6 | 7 | 8 | 9 | 10 | 11 |
|---|---|---|---|---|---|---|
| AT 910 | 74 | 74 | 66 | 71 | 61.6 | 61.4 |
| AT 2030 | 7.4 | 7.4 | 7.4 | 7.4 | — | — |
| DBDPO | 10.3 | 10.3 | 10.3 | 10.3 | 11 | 9.6 |
| $Sb_2O_3$ | 6.3 | 6.3 | 6.3 | 6.3 | 7.4 | 6.0 |
| Durastrength 200 | 2 | — | — | — | — | — |
| Metalblen C-201 | — | 2 | 10 | — | — | — |
| IM 7200 | — | — | — | 5 | — | — |
| IM 7565 | — | — | — | — | 18 | 21 |
| TR 060 | — | — | — | — | 2 | 2 |
| Horizontal Flame test | P | P | P | P | P | P |
| Glancing impact | F | F | F | F | F | F |

TABLE B-continued

Investigation on the effect of impact modifiers to improve dielectric breakdown strength after glacing impact, of an insulation passing horizontal flame test

| Components (% by wt) | 6 | 7 | 8 | 9 | 10 | 11 |
|---|---|---|---|---|---|---|
| Polymer density | 927 | 927 | 927 | 923 | 918 | 917 |

TABLE C

Investigations on the effect of softer polymers on the dielectric breakdown strength after glancing impact, of an insulation passing horizontal flame test

| Components (% by wt) | 12 | 13 | 14 | 15 | 16 | 17 | 18 |
|---|---|---|---|---|---|---|---|
| AT 910 | 66.4 | 61.6 | 66.4 | — | — | — | — |
| DBDPO | 10.3 | 10.3 | 11 | 10.3 | 10.3 | 10.3 | 10.3 |
| $Sb_2O_3$ | 6.3 | 6.3 | 7.4 | 6.3 | 6.3 | 6.3 | 6.3 |
| TR 060 | 2 | 12 | 2 | 2 | 2 | 2 | 2 |
| AT 2820 -g-silane | 81.4 | — | — | — | — | — | — |
| AT 4030 | — | 15 | 18 | — | — | — | — |
| Attane 4001 | — | — | — | 15 | — | — | — |
| 1.5 MI EVS | — | — | — | — | 81.4 | — | — |
| AT 930 (2.5 MI) | — | — | — | — | — | 81.4 | — |
| 15 MI EVS | — | — | — | — | — | — | 81.4 |
| Glancing impact | F | F | F | F | F | F | F |
| Polymer density | N/A | N/A | N/A | 923 | 926 | 926 | 926 |

TABLE D

Investigations on the effect of higher density polymers on the dielectric breakdown strength after glancing impact, of an insulation passing horizontal flame test

| Components (% by wt) | 19 | 20 | 21 | 22 | 23 | 24 | 25 | 26 | 27 |
|---|---|---|---|---|---|---|---|---|---|
| AT 910 | 41.7 | 74.6 | 61.5 | 69.6 | 61.6 | 60.9 | 60.9 | 60.9 | 60.9 |
| DBDPO | 10.3 | 10.3 | 10.3 | 10.3 | 11 | 11 | 11.2 | 11.2 | 11.2 |
| $Sb_2O_3$ | 6.3 | 6.3 | 6.3 | 6.3 | 7.4 | 7.4 | 7.4 | 7.4 | 7.4 |
| TR 060 | — | — | — | — | 2 | 2 | 2 | 2 | 2 |
| AT 980 | 83.4 | 41.7 | — | — | — | — | — | — | — |
| HD-6908 | — | — | 8.8 | 21.9 | 10 | — | — | 18.5 | — |
| HD-9856B | — | — | — | — | — | 18 | 18.5 | — | — |
| Dow 08534N | — | — | — | — | — | — | — | — | 18.5 |
| Glancing impact | P | P | F | P | P | P | P | P | P |
| Polymer density | 958 | 942 | 929 | 934 | 930 | 932 | 932 | 933 | 933 |
| Horizontal Flame test | P | P | P | P | P | P | P | P | P |

TABLE E

Flame retardant compositions tested for vertical flame test, dielectric strength after glancing impact and optimum tensile properties

| Components (% by wt) | a | b | c | d | e | f | g | h | i |
|---|---|---|---|---|---|---|---|---|---|
| AT 910 | 48 | 46 | 41 | 45 | 40 | 40 | 48 | 48 | 48 |
| DEC PLUS 25 | 35 | 20 | 25 | 12.3 | 30 | 19.8 | 20 | 22 | 24 |
| DBDPO | — | — | — | 8.5 | — | 9.6 | 10 | 12 | 13 |
| $Sb_2O_3$ | 6 | 8 | 8 | 5 | 10 | 6 | 6 | 6 | 8 |
| TRANSLINK 37 | — | 15 | 15 | 19.8 | 15 | 14.4 | 14 | 10 | 5 |
| TR 060 | 1 | 1 | 1 | 2 | 1 | 2.1 | 2 | 2 | 2 |
| TR 016 | — | — | — | — | — | — | — | — | — |
| IM 7200 | 8 | 8 | 8 | — | 4 | — | — | — | — |
| AT 2030 | 2 | 2 | 2 | 7.4 | — | 8.1 | — | — | — |
| HD-6908 | — | — | — | — | — | — | — | — | — |
| DOW 2047E | — | — | — | — | — | — | — | — | — |
| DOW 2037A | — | — | — | — | — | — | — | — | — |
| SCLAIR 14J1 | — | — | — | — | — | — | — | — | — |
| Halogen content | 22.8 | 13 | 16.3 | 15 | 19.5 | 20.8 | 21.3 | 24.3 | 26.4 |
| Total polymer | 58 | 58 | 51 | 52.4 | 44 | 48.1 | 48 | 48 | 48 |
| Polymer/Halogen (ratio) | 2.9 | 4.5 | 3.1 | 3.5 | 2.26 | 2.3 | 2.25 | 2.0 | 1.8 |
| Flame test, VW-1 (pass rate) | 1/3 | 0/3 | 4/5 | 015 | 515 | 4/5 | 2/5 | 3/5 | 5/5 |
| Break (MPa) | 9.9 | 12.1 | 8.7 | NR | NR | 12.1 | 13.4 | 12.3 | 11.2 |
| Elong. (%) | 285 | 202 | 75 | NR | NR | 88 | 108 | 108 | 92 |
| Glancing impact | F | F | F | F | F | F | F | F | F |

TABLE E-continued

Flame retardant compositions tested for vertical flame test, dielectric strength after glancing impact and optimum tensile properties

| Components (% by wt) | a | b | c | d | e | f | g | h | i |
|---|---|---|---|---|---|---|---|---|---|
| Polymer density | 916 | 884 | 916 1 927 | 920 | 928 | 928 | 926 | 926 | |

NR - not recorded
*f.p. - flaming particles

TABLE E

Flame retardant compositions tested for vertical flame test, dielectric strength after glancing impact and optimum tensile properties

| Components (% by Wt) | j | k | l | m | n | o | p | q | r | s |
|---|---|---|---|---|---|---|---|---|---|---|
| AT 910 | 48 | 54 | 28 | 28 | 28 | 28 | 25 | 25 | 25 | 33 |
| DEC PLUS 25 | 25 | 23 | 30 | 30 | 30 | 30 | 30 | 30 | — | 10 |
| DBDPO | 15 | 13 | 15 | 15 | 15 | 15 | 15 | 15 | 38 | 30.4 |
| $Sb_2O_3$ | 10 | 8 | — | — | — | — | 3 | 3 | 10 | 7.6 |
| TRANSLIM 37 | — | — | — | — | — | — | — | — | — | — |
| TR 060 | 2 | 2 | 2 | 2 | 2 | 2 | 2 | — | — | — |
| TR 016 | — | — | — | — | — | — | — | 2 | 2 | 2 |
| IM 7200 | — | — | — | — | — | — | — | — | — | — |
| AT 2030 | — | — | — | — | — | — | — | — | — | — |
| HD-6908 | — | — | 25 | 15 | 10 | 5 | — | — | — | — |
| DOW 2047E | — | — | — | 10 | 15 | 20 | — | — | — | — |
| DOW 2037A | — | — | — | — | — | — | 25 | 12.5 | 12.5 | 8.5 |
| SCLAIR 14J1 | — | — | — | — | — | — | — | 12.5 | 12.5 | 8.5 |
| Halogen content | 28.7 | 25.7 | 32 | 33. | 32 | 32 | 32 | 32 | 31.7 | 31.8 |
| Total polymer | 48 | 54 | 53 | 53 | 53 | 53 | 50 | 50 | 50 | 50 |
| Polymer/Halogen (ratio) | 1.67 | 2.1 | 1.66 | 1.66 | 1.66 | 1.66 | 1.56 | 1.56 | 1.58 | 1.57 |
| Flame test, VW-1 (pass rate) | 515 | 3/5 | 015 | 015 | 015 | 015 | 515 | 515 | *f.p. | 515 |
| Break (MPa) | 10.9 | 11.7 | 13.6 | 12.0 | 11.6 | 11.1 | 12.1 | 10.2 | 12.2 | 15.9 |
| Elong. | 192 | 228 | 10 | 10 | 25 | 115 | 0 | 145 | 350 | 308 |
| Glancing impact | F | F | P | P | P | F | P | P | P | P |
| Polymer density | 926 | 926 | 944 | 935 | 930 | 926 | 933 | 933 | 933 | 931 |

NR - not recorded
*f.p. - flaming particles

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

I claim:

1. A moisture crosslinkable flame retardant composition comprising 25-75 wt % of a vinyl trialkoxy silane random copolymer of ethylene and said silane, said copolymer having a melt flow index selected from the range 0.2-25, and a silane content selected from 0.5-5 wt %; 15-20 wt % polyethylene having a melt index selected from 0.1-30, and a density selected from 930-960 kg/m³; and 10-35 wt % decabromodiphenyl oxide.

2. A moisture crosslinkable flame retardant composition as claimed in claim 1 comprising 25-40 wt % of a vinyl trialkoxy silane copolymer having a melt flow index selected from the range 0.2-25, and a silane content selected from 0.5-5 wt %;

15-20 wt % polyethylene having a melt index selected from 0.1-30, and a density selected from 930-960 kg/m³;

5-15 wt % 1,2,3,4,7,8,9,10,13,13,14,14-dodecachloro 1,4,4a,5,6,6a,7,10,10a,11,12,12a -dodecahydro 1,4,7,10-dimethanodibenzo (a,e) cyclooctene; and 25-35 wt % decabromodiphenyl oxide.

3. A composition as claimed in claim 1 wherein said silane content is selected from 1.5-2.5 wt %.

4. A composition as claimed in claim 1 wherein said silane copolymer has a melt index selected from 0.5 to 5.

5. A composition as claimed in claim 1 comprising 30-35 wt % vinyl trialkoxy silane copolymer.

6. A composition as claimed in claim 1 wherein said vinyl trialkoxy silane is vinyl trimethoxy silane.

7. A composition as claimed in claim 1 wherein said vinyl trialkoxy silane is vinyl triethoxy silane.

8. A composition as claimed in claim 1 comprising 33 wt % of vinyl trimethoxy silane random copolymer, 17 wt % high density polyethylene, about 10 wt % 1,2,3,4,7,8,9,10,13,13,14,14-dodecachloro 1,4,4a,5,6,-,6a,7,10,10a,11,12,12a-dodecahydro 1,4,7,10-dimethanodibenzo (a,e) cyclooctene, and about 30 wt % decabromodiphenyl oxide.

9. A composition as claimed in claim 1 comprising 55-65 wt % of vinyl trimethoxy silane random copolymer, 15-20 wt % polyethylene and 10-15 wt % decabromodiphenyl oxide.

10. A composition as claimed in claim 9 comprising about 60 wt % of vinyl trimethoxy silane random copolymer, about 18 wt % polyethylene and about 10 wt % decabromodiphenyl oxide.

11. A composition as claimed in claim 1 further comprising an antimony compound.

12. A composition as claimed in claim 1 further comprising an additive selected from the group consisting of a processing aid, condensation catalyst, antioxidant and stabilizer.

13. A method for the production of a coated electrical conductor coated with a flame retardant crosslinked polyethylene composition, said method comprising coating said conductor with a moisture crosslinkable flame retardant composition as defined in claim 1 and crosslinking said composition.

14. A coated electrical conductor made by the process defined in claim 13.

* * * * *